United States Patent
Kato et al.

(10) Patent No.: US 7,824,635 B2
(45) Date of Patent: Nov. 2, 2010

(54) FILTER FOR EXHAUST GAS FROM DIESEL ENGINE AND EQUIPMENT

(75) Inventors: Yasuyoshi Kato, Kure (JP); Eiji Miyamoto, Kure (JP); Masatoshi Fujisawa, Kure (JP); Naomi Imada, Kure (JP); Hiroshi Ishizaka, Kure (JP); Kazuki Kobayashi, Kure (JP); Takeshi Hirota, Kure (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 933 days.

(21) Appl. No.: 10/580,720

(22) PCT Filed: Nov. 24, 2004

(86) PCT No.: PCT/JP2004/017394

§ 371 (c)(1), (2), (4) Date: Feb. 13, 2007

(87) PCT Pub. No.: WO2005/051517

PCT Pub. Date: Jun. 9, 2005

(65) Prior Publication Data

US 2007/0238377 A1    Oct. 11, 2007

(30) Foreign Application Priority Data

Nov. 25, 2003    (JP)  ............................... 2003-393849

(51) Int. Cl.
  *B01D 53/94*    (2006.01)
  *B01D 46/00*    (2006.01)
  *B01D 35/00*    (2006.01)
  *B01J 35/00*    (2006.01)
  *F01N 3/035*    (2006.01)

(52) U.S. Cl. .............. 423/213.2; 423/213.5; 423/239.1; 423/400; 60/299; 60/302; 95/273; 95/285; 55/307; 55/350.1; 55/524; 55/525

(58) Field of Classification Search ............. 423/213.2, 423/213.5, 239.1, 400; 60/299, 302; 95/273, 95/285; 55/307, 350.1, 524, 525

See application file for complete search history.

(56) References Cited

U.S. PATENT DOCUMENTS 4,530,418 A *    7/1985    Currie ........................ 181/227

(Continued)

FOREIGN PATENT DOCUMENTS

JP    4-342819 A    11/1992

(Continued)

OTHER PUBLICATIONS

International Search Report corresponding to International Application No. PCT/JP2004/017394, dated Feb. 22, 2005.

*Primary Examiner*—Timothy C Vanoy
(74) *Attorney, Agent, or Firm*—Fay Sharpe LLP

(57) ABSTRACT

A particulate material removing filter for exhaust gas from a diesel engine is provided. The particulate material removing filter is formed by laminating metal laths having an oxidation catalyst layer containing a noble metal that oxidizes nitrogen oxide in exhaust gas into nitrogen dioxide. The metal laths are laminated to form a laminate in such a manner that the drawing direction of the metal lath processing differs by 90 degrees with each other.

18 Claims, 2 Drawing Sheets

A DIRECTION

1: METAL LATH (METAL LATH WITH A CATALYST)

U.S. PATENT DOCUMENTS

| | | | |
|---|---|---|---|
| 6,546,717 B1 * | 4/2003 | Chandler et al. | 60/274 |
| 6,889,498 B1 * | 5/2005 | Chandler et al. | 60/311 |

FOREIGN PATENT DOCUMENTS

| | | | |
|---|---|---|---|
| JP | 10-99695 A | 4/1998 |
| JP | 2001-252574 A | 9/2001 |
| JP | 2001-280116 A | 10/2001 |
| JP | 2002-301325 A | 10/2002 |

* cited by examiner

[FIG. 1]
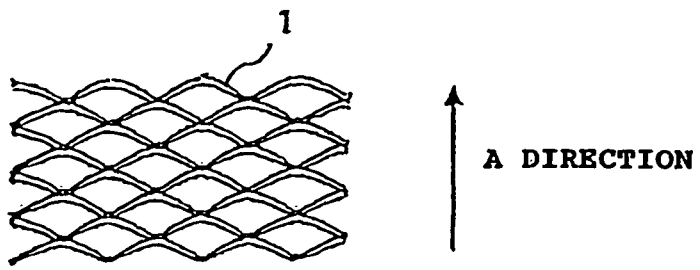
1: METAL LATH (METAL LATH WITH A CATALYST)
[FIG. 2]
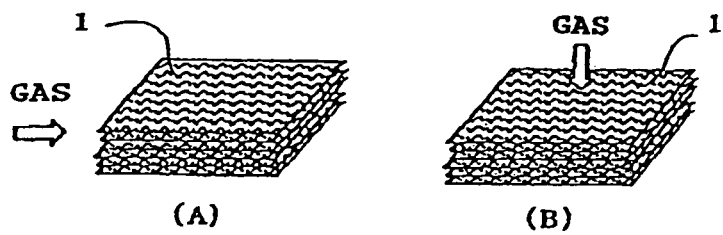
[FIG. 3]
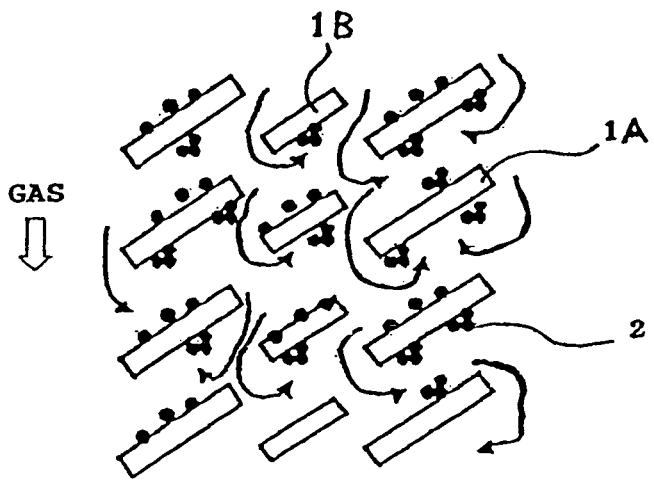
2: PARTICULATE MATERIAL
[FIG. 4]
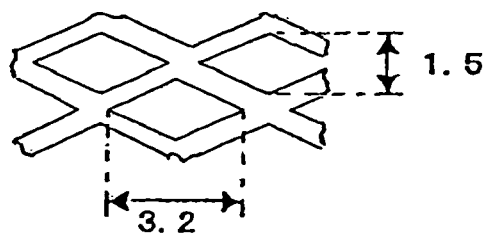

[FIG. 5]
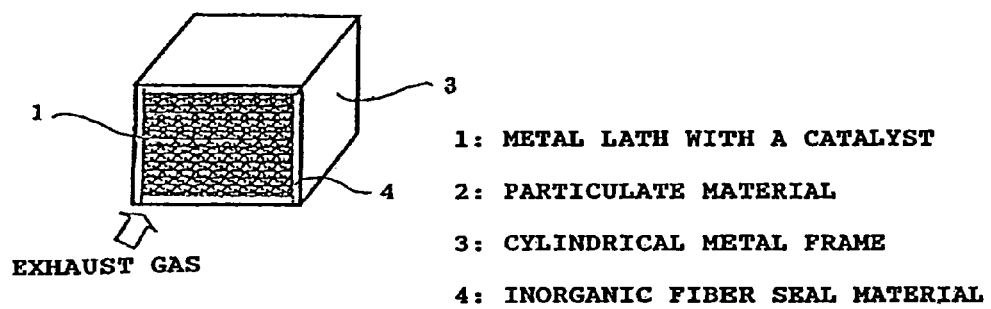
1: METAL LATH WITH A CATALYST
2: PARTICULATE MATERIAL
3: CYLINDRICAL METAL FRAME
4: INORGANIC FIBER SEAL MATERIAL
[FIG. 6]
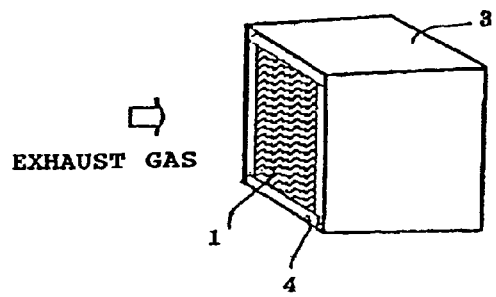

FILTER FOR EXHAUST GAS FROM DIESEL ENGINE AND EQUIPMENT

TECHNICAL FIELD

The present invention relates to an inexpensive filter for removing particulate material in exhaust gas from a diesel engine, the filter being capable of removing particulate materials (DP) contained in the gas exhausted from a diesel engine with a low draft loss without special maintenance and to a method and an apparatus for treating exhaust gas by using the filter.

BACKGROUND ART

A diesel engine (DE) is one of the most efficient internal combustion engines, as it is reduced in the discharge of carbon dioxide ($CO_2$) per constant output and economical so as to be able to use a low-quality fuel such as heavy oil. There is a tendency that the diesel engines are frequently used to prevent global warning. This is because it is reconsidered that cars and a stationary generator using a diesel engine have high energy efficiency with small amount of discharge of carbon dioxide ($CO_2$).

However, a lot of particulate material (DP) in which unburned hydrocarbons are united with soot is discharged from these diesel engines using heavy oil and light gas oil and is to be the main cause behind the pollution and a social problem. Various industries such as diesel engine makers and car makers undergo researches into and developments in the removal of DP and have made studies and inventions concerning filters having excellent ability of removing DP, DP filters (DPF) so devised that the filter is made to carry an oxidation catalyst to oxidize nitrogen oxide (NO) into nitrogen dioxide ($NO_2$) to burn soot, in order to prevent or retard clogging with soot for a long period of time (for example, Non-Patent Document 1).

Many of these technologies intend to filter exhaust gas by passing it through a thin wall porous ceramics several μm in size. Plate or cylindrical filters obtained by calcining metals or ceramics, filters using a honeycomb ceramic porous molded body of which the meshes are alternately filled up and filters using fine metal wire woven fabrics are known. Also, filters obtained by providing these filters with the ability of oxidizing NO into $NO_2$ to oxidize and burn soot with the intention of preventing or limiting clogging of these filters (for example, Patent Documents 1 and 2).

Non-Patent Document 1: Japan Environmental Management Association for Industry, Environmental Management Vol. 37, p 441-449

Patent Document 1: Publication of Japanese Patent Application Laid-Open No. 1-318715

Patent Document 2: Publication of Japanese Patent Application Laid-Open No. 60-235620

DISCLOSURE OF THE INVENTION

Problems to be Solved by the Invention

The aforementioned conventional technologies have high DP trapping efficiency and superior performances. These technologies, however, have the following problems in the case of using light oil or heavy oil as a fuel or in the case of applying these technologies to stationary generators using DE.

(i) These filters are operated based on the fundamental principle that DP is removed by filtration utilizing fine pores and therefore have a large draft loss. Many of these filters impair the characteristics of DE having high efficiency.

(ii) Many of these filters tend to cause clogging in the case where a large amount of soot is generated by unsuitable operations and eventually need measures against clogging, for example, back-washing, or heating and burning of soot, to prevent clogging.

(iii) Ashes in a fuel are accumulated in pores of the filter to cause clogging, which decreases the life of the filter.

(iv) When a removal means such as a means of combusting accumulated soot is disposed to limit the pressure drop of the filter, in order to obtain heat resistance of the filter, it is necessary to mold ceramics such as expensive cordierite or metals into porous bodies having a number of pores having a size of several μms to tens of μms, DPFs are to be very expensive to hinder the spread of DPFs.

It is an object of the present invention to solve the above conventional art problem and to provide a filter which can be structured by an inexpensive material, is resistant to clogging or closure by ashes and needs no special means such as reverse washing and heating and burning of soot. The present invention has also an object of providing an exhaust gas treating method and an apparatus using the above filter.

Means for Solving the Problems

The inventions claimed in the patent application of this case are as follows.

(1) A particulate material removing filter for exhaust gas from a diesel engine, formed by laminating metal laths having an oxidation catalyst layer containing a noble metal that oxidizes nitrogen oxide in exhaust gas into nitrogen dioxide, wherein the metal laths are laminated to form a laminate in such a manner that the drawing direction of the metal lath processing differs by 90 degrees with each other.

(2) The filter according to the above (1), wherein the filter is provided with an intermediate layer made of a metal oxide between said oxidation catalyst layer and said metal lath.

(3) The filter according to the above (1) or (2), wherein said laminate is stored in a cylindrical metal frame such that the periphery of the laminate which is in contact with the metal frame is sealed with an inorganic fiber sheet.

(4) The filter according to the above (3), wherein said laminate is stored such that the side surface of the laminate faces the opening part of said metal frame.

(5) The filter according to the above (3), wherein said laminate is stored such that the surface of the metal lath of said laminate faces the opening part of said metal frame.

(6) A method of treating exhaust gas from a diesel engine using the filter according to any of the above (1) to (4), the method comprising introducing the gas to be treated, into the filter in parallel to the surface of the metal lath of the laminate, to pass through the filter.

(7) A method of treating exhaust gas from a diesel engine using the filter according to any of the above (1) to (3) or (5), the method comprising introducing the gas to be treated, into the filter in the direction perpendicular to the surface of the metal lath of the laminate, to pass through the filter.

(8) An apparatus for treating exhaust gas using the filter according to any one of the above (1) to (5), wherein the filter is disposed at the exhaust port of a diesel engine.

EFFECT OF THE INVENTION

The particulate material removing filter of the present invention ensures that a filter can be manufactured by a simple method in which inexpensive metal laths are alternately laminated in predetermined different directions. It also makes it possible to bring the gas to be treated, into contact with the metal lath coated with NO oxidation catalyst efficiently, to collect soot and the like in the gas to be removed by oxidation. Therefore, the present invention can provide an economical and high performance DPF which is highly resistant to clogging particularly in a low-load operation without any need of a new apparatus for removing or burning dusts and soot when the filter is clogged with them.

BRIEF DESCRIPTION OF THE DRAWINGS

FIG. 1 is a view showing the shape and drawing direction of a metal lath.

FIG. 2 is an explanatory view of the basic structure of a DPF using a metal lath in the present invention.

FIG. 3 is a typical explanatory view of the structure of a metal lath in the present invention.

FIG. 4 is a view showing the shape of a metal lath used in Example 1.

FIG. 5 is an explanatory view of the structure of a DPF used in Example 1.

FIG. 6 is an explanatory view of the structure of a DPF used in Example 2.

EXPLANATION OF REFERENCE NUMERALS

1 Metal lath or a metal lath with a catalyst
2 Particulate material
3 Cylindrical metal frame
4 Inorganic fiber seal material.

BEST MODE FOR CARRYING OUT THE INVENTION

The particulate material removing filter for exhaust gas from a diesel engine according to the present invention includes a laminate obtained by laminating metal laths having an oxidation catalyst layer containing a noble metal that oxidizes NO in exhaust gas into $NO_2$, in such a manner that the drawing directions of the metal lath processing differs by 90 degrees with each other.

The metal lath used in the present invention is obtained, for example, by processing a thin steel plate such as an stainless steel plate so processed as to have a plate thickness of 1 mm or less and preferably 0.3 mm or less into a porous plate having openings having a diameter of several mm according to the metal lath processing carried out by forming a large number of slits alternately in the steel plate and by drawing the steel plate in the direction perpendicular to these slits. As a material for the metal lath, SUS430, SUS304 or the like is usually used though it depends on temperature and term in use. Also, a material to which aluminum is added or soft steel may be used for the purpose of preventing high-temperature oxidation.

After lubricating oil and the like used in the processing of the metal lath are removed, it is coated with a catalyst having a noble metal that oxidizes NO into $NO_2$ as it is or after it is coated with an intermediate layer of a metal oxide such as silica, alumina, titania or zirconia and dried or calcined.

As the catalyst oxidizing NO, Pt, Pd and Rh may be used either singly or in combination of two or more. Even in the case of using, particularly, Pt singly, a better effect can be obtained. As a support for these noble metals, besides silica, alumina, titania or zirconia, alumina to which alkali earth metals or rare earth metals are added, may be used with the intention of improving heat resistance. It is preferable to use titania or silica, which is not corroded by $SO_x$, as the support, particularly, in the treatment of exhaust gas from an engine using heavy oil having a large sulfur content as a fuel. Also, the amount of the catalyst supported on the metal lath is preferably 5 to 100 g/m$^2$ from the viewpoint of pressure drop, etc. The amount of only a noble metal supported is preferably 0.01 to 0.2 g/m$^2$ from the viewpoint of catalytic effect and economically. The oxidation catalyst layer may be formed on the metal lath by a known method. For example, the method is carried out by dipping the metal lath in a solution or slurry containing each catalyst component, which is then drained off, followed by drying and calcining.

The metal lath coated with the oxidation catalyst layer is cut into a square shape having a predetermined dimension, then two or more of the cut metal laths being laminated to manufacture a laminate. As to the lamination of the metal laths in this case, it is necessary to laminate these metal laths in such a manner as to make the metal laths differ alternately by 90 degrees in the drawing direction (the direction of A in FIG. 1) of metal lath processing. The laminate obtained by laminating these metal laths has a specific gravity of about 1 and may be therefore considered to be a porous body having a porosity exceeding 80%. Such a structure makes it possible that the flow of the gas to be treated passing through the laminate is made to be turbulent, and enables effective contact between the gas, to obtain an efficient collection and oxidation removal of DP from the gas, whereby clogging and pressure drop due to soot, etc. in a low-load operation can be prevented from occurring.

Specifically, the typical structure of the laminate of metal laths in the present invention is, as shown in FIG. 3, has wall-like parts rising steeply against the flow of gas. 1A and 1B in the figure show the metal laths which respectively have the same shape and are laminated in such a manner that they differ by 90 degrees alternately in the direction of metal lath processing. When diesel engine exhaust gas containing DP is made to pass through the laminate in which a large number of metal laths are laminated in the above manner, eddy flow is generated in the metal lath 1 parts rising steeply, to enhance the contact efficiency between the gas and the metal lath remarkably. As a result, DP2 contained in the gas collides severely with the metal lath plate, to be collected and also, accumulated at downstream part of the metal lath plate where the flow rate of the gas is low. On the other hand, NO in the exhaust gas is oxidized into $NO_2$ by the action of the coated noble metal catalyst component, which $NO_2$ oxidizes flammable components in DP2 collected and accumulated in DP2. Since the content of ash in DP2 is 10% or less though depending on the state of combustion, the specific gravity of particles collected and accumulated is significantly smaller, depending of the combustion condition of the flammable components in DP2, resulting in that the particulate material is peeled off from the metal lath plate and diffused by the eddy flow generated in the above steep wall-like parts of the metal lath plate.

Since the filter of the present invention does not bring about a rise in pressure drop caused by clogging, it is possible to attain a long-term operation even in the situation where pores are so obstructed as to require back-washing or an operation for combusting sootas in conventional DPFs made of ceramic porous bodies or metal woven fabric having only fine pores.

In the DPF of the present invention, the area of the catalyst per unit volume of the metal lath supporting the catalyst is so large that the DPF is superior in the activity to oxidize NO in the gas, making it possible to decrease the amount of a noble metal to be used. Also, because the above area is large, oil mists and unburned hydrocarbons generated when an engine is started are easily oxidized. Accordingly the DPF of the present invention is superior in eliminating black smokes or bad odors occurred at starting.

The shape of the laminate in the present invention is so devised that its length in the direction of the passage of gas to be treated is usually 100 to 600 mm though it differs depending on the direction of the passage of the gas. The laminates are usually laminated and stored in a cylindrical metal frame upon use. When the laminates are stored, it is preferable to seal the periphery of the laminates which are in contact with the metal frame, with an inorganic fiber sheet, to improve the ability of removing particular materials.

In the present invention, when the gas to be treated is made to pass through the laminates to collect particulate materials and then to oxidize and remove them, the gas to be treated may be introduced into the laminates in the following manner. In one method, as shown in FIG. 2(A), the gas to be treated is introduced in parallel to the surface of the metal lath of the laminates. In this case, it is only required to dispose the laminates such that side surfaces of the laminates (section of the metal laths) are located at the opening portion of the cylindrical metal frame (see FIG. 5). In another method, as shown in FIG. 2(B), the gas to be treated is introduced in the direction perpendicular to the side surfaces of the laminates. In this case, it is only required to store the laminates such that the surface of the laminate is located at the opening portion of the cylindrical metal frame (see FIG. 6).

EXAMPLES

The present invention will be explained in more detail by way of examples, which are, however, are not intended to be limiting of the present invention.

Example 1

SUS 430 band steel having a thickness of 0.2 t was subjected to lath-cutting processing at a feed width of 0.47 mm to obtain a metal lath (plain lath) having the mesh form shown in FIG. 4. This metal lath was dipped in a slurry of catalyst components consisting of 40% by weight of Titania (trade name: CR50, manufactured by Ishihara Sangyo Co., Ltd.), 20% by weight of a silica sol (content of $SiO_2$: 20% by weight) and 1% by weight of polyvinyl alcohol which were balanced with water. Then, the metal lath was pulled up and subjected to air blowing to remove excess slurry. The metal lath was dried at 150° C. for insolubilizing treatment, to obtain a metal lath provided with a thin intermediate layer having a supporting amount of 30 g/m² of the catalyst components.

In the meantime, 6.25 g of a dinitrodiammineplatinum solution containing 8% by weight of Pt was added to a solution prepared by adding 200 g of water to 100 g of titania (specific surface area 90 m²/g, manufactured by Ishihara Sangyo Co., Ltd.) and the mixture was heated on a sand bath to evaporate to dryness. The obtained block material was calcined at 500° C. and milled by a hammer mill to obtain a catalyst powder. 70 g of this powder, 30 g of titania (trade name: CR50, Ishihara Sangyo Co., Ltd.) having a low surface area, 100 g of silica sol ($SiO_2$: 20% by weight) and 200 g of water were mixed to prepare a catalyst slurry. The lath plate which was previously coated with the intermediate layer was dipped in this slurry and then, subjected to air blowing to remove excess slurry. Then, the coated metal lath was dried at 150° C. and calcined at 600° C. for 2 hours to obtain a metal lath on which 33 g/m² of oxidation catalyst was supported.

The obtained metal laths with a catalyst were respectively cut into a 150 mm by 150 mm square. 200 metal laths were laminated with alternately changing the direction of each metal lath by 90 degrees. The laminate was placed in a cylindrical metal frame such that the section of the metal lath plate was located at the opening portion of the metal frame as shown in FIG. 5 (corresponding to FIG. 2(A)), and that the periphery of the laminate which was in contact with the metal frame was sealed with an inorganic fiber sheet to make a 150-mm-long DPF which was a 150 mm by 150 mm square. The amount of the catalyst to be supported in the DPF was 44 g/L and the amount of Pt to be supported was 0.22 g/L.

Example 2

A DPF was manufactured in the same manner as in Example 1 except that the laminate of metal laths with a catalyst was placed in the cylindrical metal frame such that the laminate surface was located at the opening portion of the metal frame as shown in FIG. 6 (corresponding to FIG. 2(b)).

Example 3

A DPF was manufactured in the same manner as in Example 1 except that in place of titania in the preparation of the oxidation catalyst component of Example 1, a material prepared by dissolving cerium nitrate in water, adding an aluminum hydroxide powder thereto such that the atomic ratio of Al/Ce was 90/10, evaporating to dryness, and calcining at 500° C. was used.

Comparative Example 1

A commercially available cordierite ceramic DPF (Manufactured by NGK INSULATORS, LTD., cell number: 100 cpsi, 5.66 inch φ×6 inch long) manufactured by alternately plugging up passages of a honeycomb molded body was impregnated with a titania sol (manufactured by Ishihara Sangyo Co., Ltd., $TiO_2$ content: 30% by weight) Then, a centrifuge was used to drain off, thereby supporting 60 g/L of $TiO_2$ on the DPF, which was then dried at 150° C. to obtain a DPF. Thereafter, the DPF was impregnated with a dinitrodiammineplatinic acid solution in an amount of 0.2 g/L as Pt, dried and calciined at 600° C. for 2 hours to manufacture a DPF with a catalyst.

Test Example

The DPFs obtained in Examples 1 to 3 and Comparative Example 1 were respectively disposed at the exit of a diesel engine using A-class heavy oil as a fuel to examine the amount of gas and the following items. The results are shown in Table 1.

(1) Presence of black smoke at starting an engine.

(2) Presence of a rise in the pressure drop in a low-load operation (DPF temperature: about 300° C.).

(3) Pressure drop and presence of a rise in the pressure drop in a 100% rated operation (DPF temperature: about 400° C.).

(4) Concentration of particulate materials at the inlet and exit of the DPF in a 100% rated operation.

TABLE 1

| | Visual Condition of black smoke at starting | Rise in Pressure drop in a low-load operation | Condition when a 100% load is applied | | Concentration of DP when a 100% load is applied | |
|---|---|---|---|---|---|---|
| | | | Pressure drop (mm H$_2$O) | Presence of a rise in pressure drop | DPF inlet (mg/m$^3$) | DPF exit (mg/m$^3$) |
| Example 1 | None | A little | 140 | None | 28 | 9 |
| Example 2 | None | A little | 200 | None | 28 | 8 |
| Example 3 | None | A little | 140 | None | 22 | 9 |
| Comp. ex. 1 | None | Sharp rise, Clogged in 2 hours | 320 | Rise in Pressure by 40 mmH$_2$O in 5 hours | 28 | 4 |

As is clear from Table 1, the DPF of Comparative Example 1 could not only be operated because of a high pressure drop and a rise in pressure drop with time, when the temperature of the DPF was low in the case of a low-load operation, but also even in a rated operation performed at high temperatures, a slight rise in large pressure drop continued. On the other hand, the DPFs of the present invention (Examples 1 to 3) were reduced in pressure drop and in a rise in pressure drop in a low-load operation, so as to be operated without any trouble. They had a pressure drop as small as half or one-third that of Comparative Example 1, to find that the DPFs of the present invention were superior to the DPF of Comparative Example. Also, the concentration of dusts in a rated operation was 10 mg/m$^3$ or less.

It was also found in the case of the DPF of Comparative Example 1 that though the concentration of dusts in a rated operation was low, pressure drop in a low-load operation was large and the DPF was clogged in 2 hours, so that an apparatus enabling a low-load operation, and a means and control equipment for restoring the filter increased in pressure drop to the original state in the rated operation were required, whereas the DPF of the present invention made it possible to continue a low-load operation without any special means and to more efficiently use the output of an engine for power generation due to less pressure drop under the rated load.

INDUSTRIAL APPLICABILITY

According to the present invention, particulate materials discharged from a diesel engine can be removed with a low draft loss without special maintenance. Therefore an inexpensive DPF can be provided. The DPF of the present invention is so useful in preventing environmental air pollution to have a large social and economical effect.

The invention claimed is:

1. A particulate material removing filter for exhaust gas from a diesel engine, formed by laminating metal laths having an oxidation catalyst layer containing a noble metal that oxidizes nitrogen oxide in exhaust gas into nitrogen dioxide, wherein the metal laths are laminated to form a laminate in such a manner that the drawing direction of the metal lath processing differs by 90 degrees with each other.

2. The filter according to claim 1, wherein the filter is provided with an intermediate layer made of a metal oxide between said oxidation catalyst layer and said metal lath.

3. The filter according to claim 1 wherein said laminate is stored in a cylindrical metal frame such that the periphery of the laminate which is in contact with the metal frame is sealed with an inorganic fiber sheet.

4. The filter according to claim 3, wherein said laminate is stored such that the side surface of the laminate faces the opening part of said metal frame.

5. The filter according to claim 3, wherein said laminate is stored such that the surface of the metal lath of said laminate faces the opening part of said metal frame.

6. A method of treating exhaust gas from a diesel engine using the filter according to claim 1, the method comprising introducing the gas to be treated, into the filter in parallel to the surface of the metal lath of the laminate, to pass through the filter.

7. A method of treating exhaust gas from a diesel engine using the filter according to claim 1, the method comprising introducing the gas to be treated, into the filter in the direction perpendicular to the surface of the metal lath of the laminate, to pass through the filter.

8. An apparatus for treating exhaust gas using the filter according to claim 1, wherein the filter is disposed at the exhaust port of a diesel engine.

9. The filter according to claim 2, wherein said laminate is stored in a cylindrical metal frame such that the periphery of the laminate which is in contact with the metal frame is sealed with an inorganic fiber sheet.

10. A method of treating exhaust gas from a diesel engine using the filter according to claim 2, the method comprising introducing the gas to be treated, into the filter in parallel to the surface of the metal lath of the laminate, to pass through the filter.

11. A method of treating exhaust gas from a diesel engine using the filter according to claim 3, the method comprising introducing the gas to be treated, into the filter in parallel to the surface of the metal lath of the laminate, to pass through the filter.

12. A method of treating exhaust gas from a diesel engine using the filter according to claim 4, the method comprising introducing the gas to be treated, into the filter in parallel to the surface of the metal lath of the laminate, to pass through the filter.

13. A method of treating exhaust gas from a diesel engine using the filter according to claim 3, the method comprising introducing the gas to be treated, into the filter in the direction perpendicular to the surface of the metal lath of the laminate, to pass through the filter.

14. A method of treating exhaust gas from a diesel engine using the filter according to claim 5, the method comprising introducing the gas to be treated, into the filter in the direction perpendicular to the surface of the metal lath of the laminate, to pass through the filter.

15. An apparatus for treating exhaust gas using the filter according to claim 2, wherein the filter is disposed at the exhaust port of a diesel engine.

16. An apparatus for treating exhaust gas using the filter according to claim 3, wherein the filter is disposed at the exhaust port of a diesel engine.

17. An apparatus for treating exhaust gas using the filter according to claim 4, wherein the filter is disposed at the exhaust port of a diesel engine.

18. An apparatus for treating exhaust gas using the filter according to claim 5, wherein the filter is disposed at the exhaust port of a diesel engine.

* * * * *